(Model.)
H. W. KELLOGG.
METHOD OF RAISING CREAM FROM MILK.
No. 269,864. Patented Jan. 2, 1883.
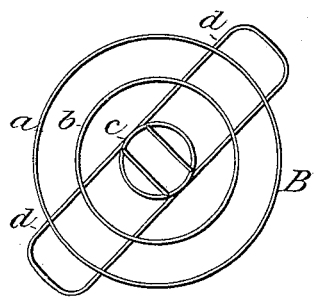
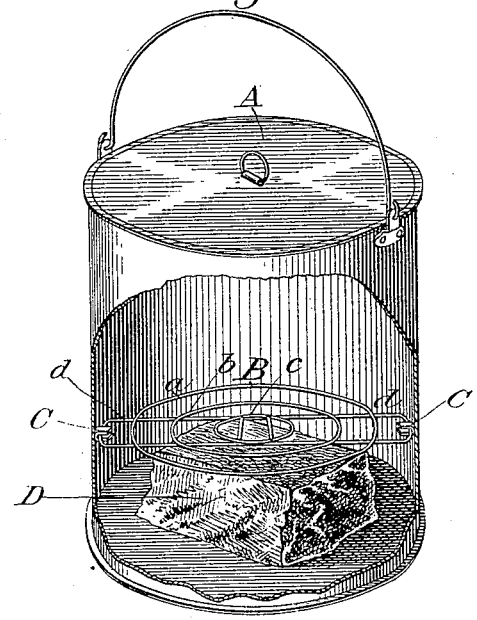
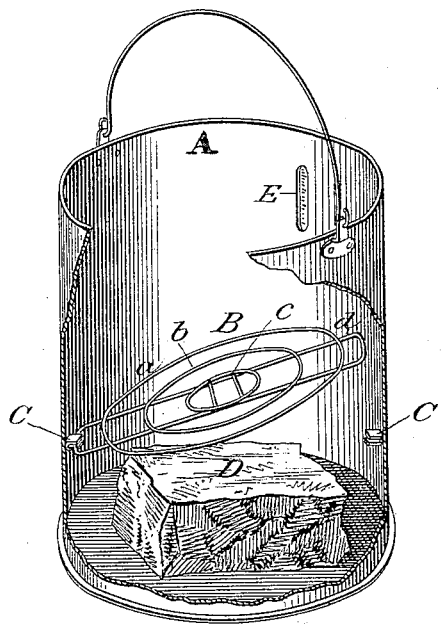
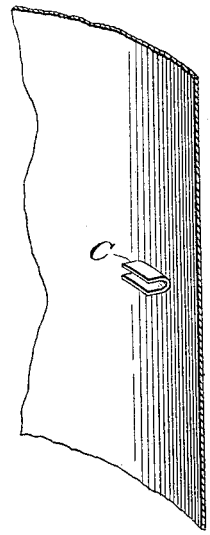
Witnesses:
Wm D Conklin
T. L. Kernan
Inventor.
Henry W. Kellogg

UNITED STATES PATENT OFFICE.

HENRY W. KELLOGG, OF RIPON, WISCONSIN.

METHOD OF RAISING CREAM FROM MILK.

SPECIFICATION forming part of Letters Patent No. 269,864, dated January 2, 1883.

Application filed July 24, 1882. (Model.)

*To all whom it may concern:*

Be it known that I, HENRY W. KELLOGG, a citizen of the United States, residing at Ripon, in the county of Fond du Lac and State of Wisconsin, have invented certain new and useful improvements in increasing the yield and improving the quality of cream from the same bulk of milk and leaving the residuum or skimmed milk in fresh sweet condition for cheese-making or other use; and I do hereby declare that the following is a full, clear, and exact description of the invention, which will enable others skilled in the art to which it appertains to make and use the same.

Milk is mainly composed of cream, caseine, sugar, some neutral salts, and water. Caseine is coagulated by the application of heat. Cream is the oily or unctuous element, and, like all oleaginous matter, hardens or concretes on being cooled. These are well-known facts. Hence in dairying processes cheese is made by heating the milk; butter by cooling it. It is an equally well-known fact that rapid cooling of milk hastens the formation and increases the quantity of the cream, because, as aforesaid, congelation promotes concretion in oily matter, but retains in solution albuminous matter, and so with milk, gathers and raises the cream unimpeded by and unmixed with the caseine. It is also a well-known fact that the fresher and sweeter the milk, and the quicker and more thoroughly the cream is "raised" or concreted from it, the better in quantity and quality will be the butter produced, and the more valuable will be the skimmed milk for cheese-making or other use.

The object of my invention is by rapid refrigeration to facilitate the concretion of cream, and thus increase its quantity and quality from a given bulk of milk; and to this end my invention consists of the direct application of ice to milk in a convenient, effectual, and inexpensive manner. The accompanying drawings elucidate the process by which I attain this object.

Similar letters refer to similar parts throughout the several views.

Figures 1 and 2 are general views of an apparatus adapted to the purposes of my process. Fig. 3 is a top view of a grating or net confining, in connection with the catch, as shown in Fig. 4, the ice to the bottom of the vessel or receiver.

A is the vat, vessel, or receiver of the milk.

B *a b c d* is a grating, net, or bars to hold down the ice.

C is the catch or hook securing the grating or net.

D is the ice in the bottom of the receiver.

E is a sight-gage (of glass or transparent substance) to show the formation and measure the thickness of the cream without disturbing its surface.

To accomplish this, I fill the empty milk vat or vessel to about one-fourth its depth with clean pure ice, in as large cakes or pieces and as compactly placed as may be. This bulk of ice will give my requisite proportion of ice to milk—to wit, about ten pounds of ice to forty pounds of milk—when the vat or vessel is filled up. The specific gravity of ice being less than that of milk, it will naturally float, and so mingle with and impede the raising and formation of the cream on the surface. I therefore confine the ice to the bottom of the vat or vessel before filling with milk by means of bars, grating, nets, or similar device, secured by hooks, catches, buttons, or other equivalent device, and for which means of holding down the ice I claim no novelty. Having thus lined the vat with ice secured to the bottom thereof, and of the aforesaid relative bulk, I pour in the milk until the vat is full, or nearly so. The cream is quickly and thoroughly extracted, rises and forms evenly on the surface, leaving a fresh and sweet residuum of "skim-milk."

The cream may be removed in about forty minutes after the setting as above, and the skim-milk then drawn from the vat, when no material part of the ice will have melted, and the water from the melting ice neither mingles with the (oily) cream at all, nor with the skim-milk in quantity to perceptibly affect its value or use for any purpose.

I prefer a long vat, of about one foot in depth, and pour the milk in at one end thereof, so that on the one hand the milk will meet at once with and flow over the whole surface of the ice, and on the other hand the frigidity will permeate more quickly and fully the comparatively thin top layer of milk.

I claim no improvement in the construction of the vessels or apparatus of the creamery or novelty in the principle of refrigerating milk for purposes of raising cream; but

I do claim as my invention—

The improved method of raising cream from milk, which consists in applying ice directly to the lower stratum of milk contained in a receiver, substantially as described.

HENRY WESLEY KELLOGG.

Attest:
 THOS. HARRIS,
 FRANK E. WATSON.